United States Patent [19]
Simdon et al.

[11] Patent Number: 5,931,206
[45] Date of Patent: Aug. 3, 1999

[54] AUTOMOTIVE FUEL FILLER PIPE VALVE ASSEMBLY

[75] Inventors: Craig L. Simdon, Des Plaines; Jason K. Trotter, Aurora; Eric G. Parker, Chicago, all of Ill.

[73] Assignee: Illinois Tool Works Inc., Glenview, Ill.

[21] Appl. No.: 09/062,519

[22] Filed: Apr. 17, 1998

Related U.S. Application Data

[63] Continuation-in-part of application No. 08/991,793, Dec. 12, 1997, and application No. 08/991,215, Dec. 16, 1997.

[51] Int. Cl.$^6$ .................................................. B65B 1/04
[52] U.S. Cl. .................... 141/312; 141/301; 220/86.2; 220/DIG. 33
[58] Field of Search ...................... 141/312, 346, 141/347, 348, 349, 301; 220/86.2, DIG. 33

[56] References Cited

U.S. PATENT DOCUMENTS

| | | |
|---|---|---|
| 2,801,767 | 8/1957 | Mariani . |
| 2,979,238 | 4/1961 | Bramming . |
| 3,083,725 | 4/1963 | Moen . |
| 3,228,652 | 1/1966 | Antrim . |
| 3,729,170 | 4/1973 | Lewis et al. . |
| 4,137,936 | 2/1979 | Sekimoto . |
| 4,485,963 | 12/1984 | Panicci . |
| 4,532,969 | 8/1985 | Kwaan . |
| 4,676,480 | 6/1987 | Garceau et al. . |
| 4,986,439 | 1/1991 | Ott et al. . |
| 5,195,566 | 3/1993 | Ott et al. . |
| 5,205,536 | 4/1993 | Holec . |
| 5,255,721 | 10/1993 | Brand . |
| 5,271,880 | 12/1993 | Lindsay . |
| 5,466,016 | 11/1995 | Briody et al. . |
| 5,547,099 | 8/1996 | Chang . |
| 5,579,732 | 12/1996 | Hajek . |

*Primary Examiner*—Steven O. Douglas
*Attorney, Agent, or Firm*—Schwartz & Weinrieb

[57] ABSTRACT

A fuel filler pipe valve assembly having a valve member with a partially substantially spherical portion pivotally disposed in a valve receptacle of a housing member, the valve member having a passage with an inlet opening and an outlet opening, and the housing having an inlet opening coupled to the fuel filler pipe and an outlet opening coupled to a body panel. The valve member is pivotal in the valve receptacle to open and close the fuel filler pipe. The valve member is formed of a valve shell portion and a valve cover portion, and the housing member is formed of a housing shell portion and a housing cover portion. A rotatable drive gear disposed through the housing member is engagable with a gear member on a truncated portion of the valve member to pivot the valve member in the housing member.

20 Claims, 3 Drawing Sheets

AUTOMOTIVE FUEL FILLER PIPE VALVE ASSEMBLY

CROSS REFERENCE TO RELATED APPLICATIONS

The present application is a continuation-in-part of co-pending U.S. application Ser. No. 08/991,793, filed Dec. 12, 1997 entitled "Automotive Fuel Filler Pipe Ball Valve Assembly" and copending U.S. application Ser. No. 08/991,215 entitled "Automotive Fuel Filler Pipe Housing With Snap-Over Trim Ring", filed on Dec. 16, 1997, assigned commonly herewith, and incorporated herein by reference.

FIELD OF THE INVENTION

The present invention relates generally to automotive refueling systems, and more particularly to automotive fuel filler pipe pivotal valve and housing assemblies mountable on automotive body panels.

BACKGROUND OF THE INVENTION

The referenced U.S. application Ser. No. 08/991,215 entitled "Automotive Fuel Filler Pipe Ball Valve Assembly" generally discloses a tamper proof automotive fuel filler pipe assembly that can be opened and closed remotely, for example from within a passenger cabin or trunk space, without contacting the vehicle exterior. The assembly includes a ball valve member with a fuel passage therethrough pivotally disposed in a ball valve receptacle of a housing member. The housing member has a fuel pipe opening coupled to a fuel filler pipe extending from a fuel tank, and another opening frangibly coupled to an opening in the body panel. The ball valve member is pivotal in the housing member to open and close the fuel filler pipe, whereby a portion of the ball valve member cooperates with a sealing member about the fuel pipe opening to seal the filler pipe. An exterior side portion of the ball valve member is positioned in the opening of the housing member when the fuel filler pipe is closed to prevent debris from entering the fuel tank and to provide an aesthetic appearance.

The present invention is drawn generally to automotive refueling systems, and more particularly to fuel filler pipe pivotal valve assemblies.

OBJECTS OF THE INVENTION

It is an object of the invention to provide novel fuel filler pipe valve assemblies that overcome problems in the prior art, and that are economical to manufacture, operate and maintain.

It is another object of the invention to provide novel automotive fuel filler pipe assemblies that may be opened and closed without contacting the vehicle exterior, and more particularly provide fuel filler pipe valve assemblies that can be opened and closed remotely, for example from within a passenger cabin and or trunk space thereof, thereby providing access to the fuel filler pipe in some applications and opening and sealingly closing the fuel filler pipe in other applications.

It is another object of the invention to provide novel fuel filler pipe valve assemblies that are tamper proof, and that are openable and closable by pivoting a valve member pivotally disposed in a housing member from behind an automotive body panel, generally inaccessible from the vehicle exterior, control over which is integratable with automotive electrical systems to prevent, for example, refueling while running the motor, and to prevent starting the motor without first closing the fuel pipe.

It is another object of the invention to provide novel fuel filler pipe valve assemblies that meet governmental regulations and industry standards pertaining to automotive fuel systems, and more particularly to provide filler pipe valve assemblies that prevent substantial fuel leakage upon accidental impact.

It is a more particular object of the invention to provide novel automotive fuel filler pipe valve assemblies generally comprising a valve member having a partially substantially spherical portion pivotally disposed in a valve receptacle of a housing member, the valve member having a passage with inlet and outlet openings, and the housing having an inlet opening couplable to the filler pipe, whereby the valve member is pivotal in the valve receptacle to open and close the filler pipe.

It is another more particular object of the invention to provide novel fuel filler pipe valve assemblies generally comprising a valve member pivotally disposed in a housing member, and a first sealing member disposed therebetween about an inlet opening thereof for sealingly closing the fuel filler pipe when the valve member is pivoted to cover the fuel filler pipe.

It is another more particular object of the invention to provide novel fuel filler pipe valve assemblies comprising a valve member pivotally disposed in a housing member, the valve member generally comprising of a valve shell portion and a valve cover portion, and the housing member generally comprising of a housing shell portion and a housing cover portion, which are preferably formed of plastic materials.

It is yet another more particular object of the invention to provide novel fuel filler pipe valve assemblies comprising a valve member pivotally disposed in a housing member, and a rotatable drive gear extending through the housing member and engagable with a gear member on a portion of the valve member, whereby the gear member and rotatable drive gear are preferably spiroid gears.

BRIEF DESCRIPTION OF THE DRAWINGS

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators throughout the several views, and wherein.

DETAILED DESCRIPTION OF THE INVENTION

Figure 1:
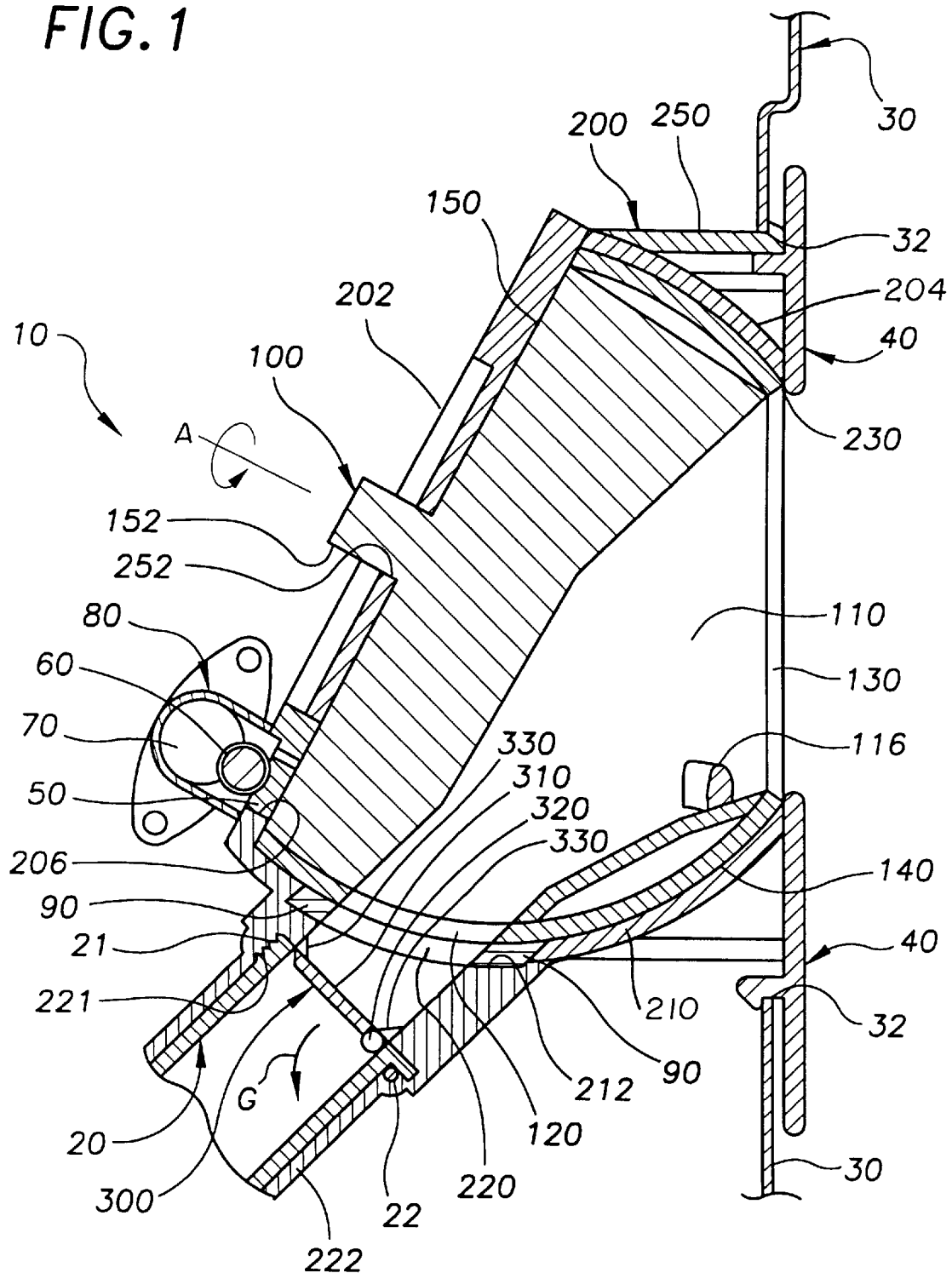
FIG. 1 is a partial sectional view of an automotive fuel filler pipe valve assembly according to an exemplary embodiment of the invention.

FIG. 1 illustrates an automotive fuel filler pipe valve assembly 10 generally comprising a valve member 100 pivotally disposed in housing member 200 coupled to a fuel filler pipe 20, wherein the valve member 100 is pivotal about a pivot axis to open and close the fuel filler pipe 20. The housing member 200 includes a fastening ring portion 250 for mounting the assembly 10 in an opening 32 of a vehicle body panel 30. The housing member 200 is preferably frangibly mounted to the body panel 30, and breaks away therefrom during impact without opening of the fuel filler pipe 20 as disclosed more fully in the referenced copending U.S. application Ser. No. 08/991,793 entitled "Automotive Fuel Filler Pipe Ball Valve Assembly". The housing member 200 may also include a retaining ring 40 or other member installable on the fastening ring portion 250 thereof and interfacing continuously with the body panel 30 as disclosed more fully in the referenced copending U.S. application Ser. No. 08/991,215 entitled "Automotive Fuel Filler Pipe Housing With Snap-Over Trim Ring".

Figure 2A:
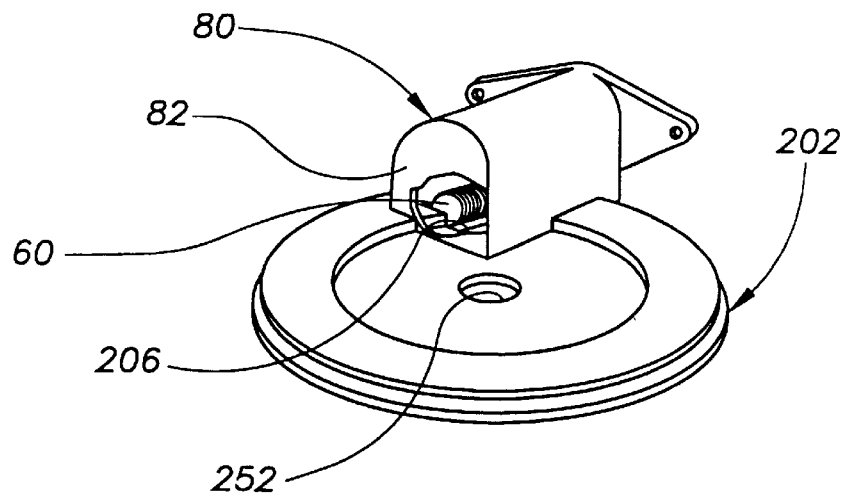
FIG. 2a is a perspective view of a housing cover portion.
Figure 2B:
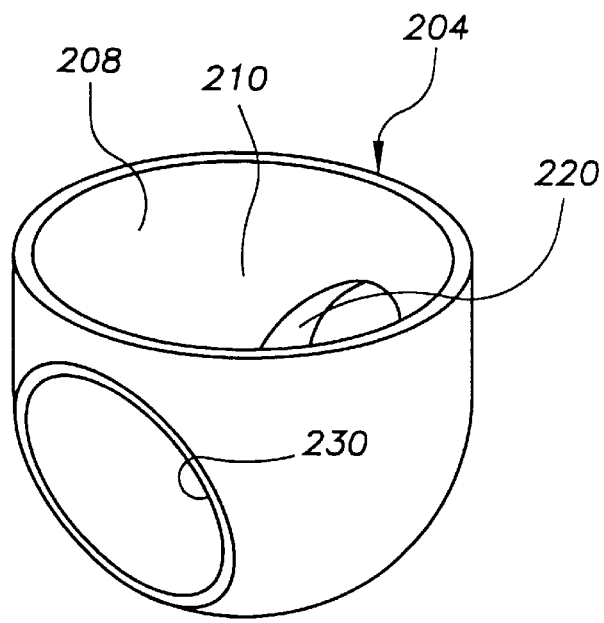
FIG. 2b is a perspective view of a housing shell portion matable with the housing cover portion of FIG. 2a so as to form a housing member of the automotive fuel filler pipe valve assembly.

FIG. 1 illustrates the housing member 200 generally comprising a valve receptacle 210, also identified in FIG. 2b, having an inlet opening 220 and an outlet opening 230. FIG. 1 also illustrates the valve member 100 generally comprising a passage 110 with an inlet opening 120 and an outlet opening 130. When the valve member 100 is pivoted to open the filler pipe 20, the inlet opening 120 of the valve member 100 is coupled to the inlet opening 220 of the housing member 200 and the outlet opening 130 of the valve member 100 is coupled to the outlet opening 230 of the housing member 200. In one embodiment, a portion of the valve member 100 sealingly covers the filler pipe 20 when the valve member 100 is pivoted to close the filler pipe, and in other embodiments the valve member 100 merely opens and closes the access to the fuel filler pipe 20 without sealing, as discussed further below.

Figure 3A:
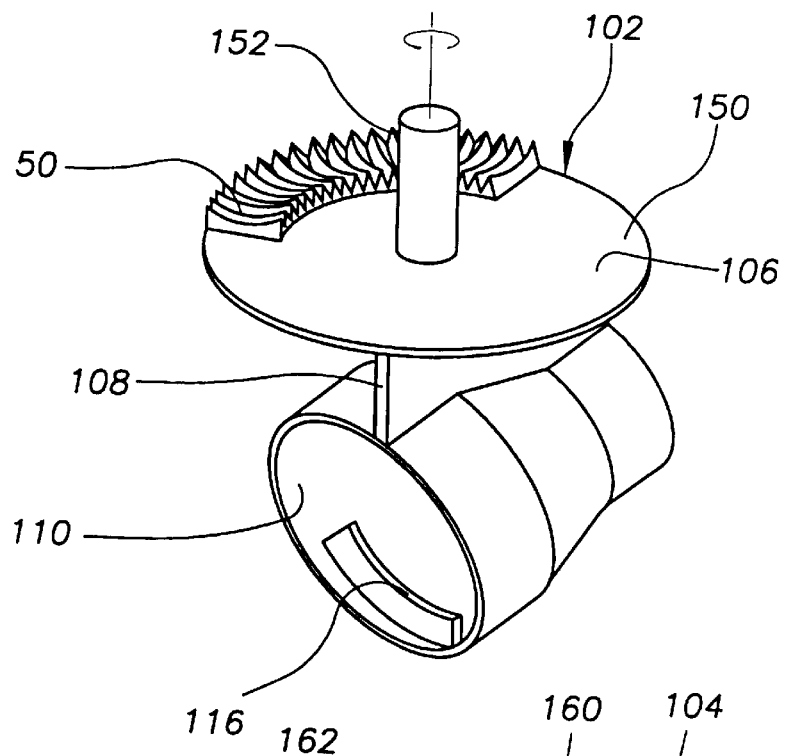
FIG. 3a is a perspective view of a valve cover portion.
Figure 3B:
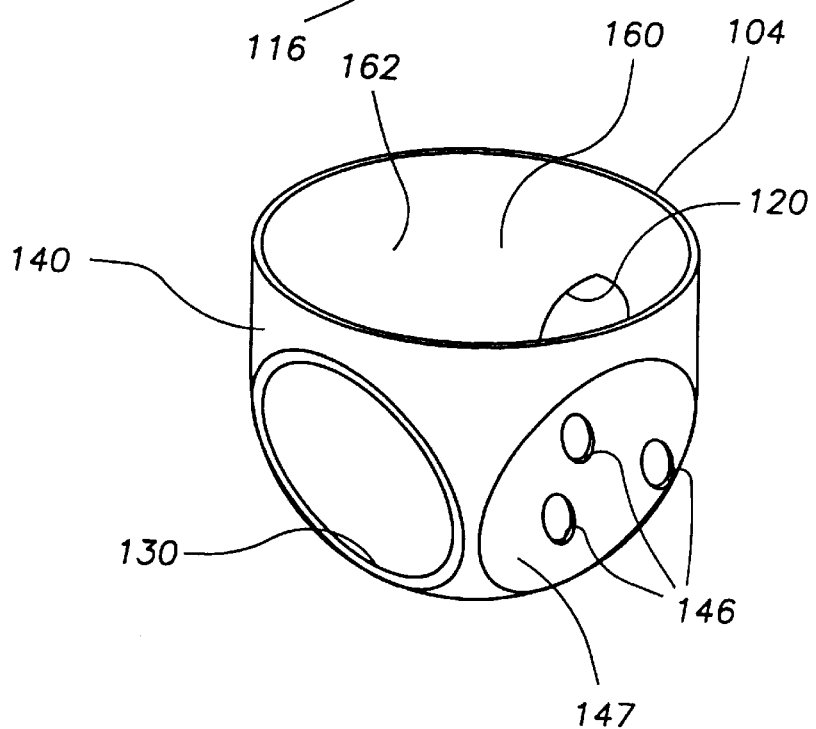
FIG. 3b is a perspective view of a valve shell portion matable with the valve cover portion of FIG. 3a so as to form a valve member of the automotive fuel filler pipe valve assembly.

The valve member 100 also comprises a partially substantially spherical portion 140 and a truncated portion 150 pivotally disposed at least partially in the valve receptacle 210 of the housing member 200. The valve receptacle 210 comprises a complementary partially substantially spherical shape for pivotally accommodating the valve member 100. Generally, the complementary partially substantially spherical portions of the valve member 100 and housing member 200 include any one of a partially ellipsoidal shape, or a partially spherical shape, or a partially paraboloidal shape, or any other curved shape that permits the valve member 100 to pivot in the housing member 200. In some embodiments a portion of the valve member 100 is shaped to sealingly close the fuel filler pipe 20. The partially substantially spherical portion of the valve member 100 may include a partially cylindrical portion extending therefrom to form the truncated portion 150. FIGS. 1, 3a and 3b illustrate the passage 110 with the inlet and outlet openings 120 and 130 disposed through the partially substantially spherical portion 140 of the valve member 100.

Figure 3C:
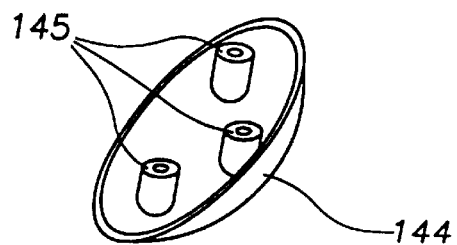
FIG. 3c is a perspective view of a trim plate matable with the valve shell portion of FIG. 3b.

FIG. 3c illustrates an exterior trim plate 144 that forms an exterior side portion of the partially substantially spherical portion 140. The trim plate 144 is disposable at least partially in the outlet opening 230 of the housing member 200 when the valve member 100 is pivoted to close fuel filler pipe 20, thereby closing the outlet opening 230 of the housing member 200. The trim plate 144 is preferably contoured or shaped to conform substantially continuously with contours of the automotive body panel 30. The trim plate 144 may be formed integrally with the valve member 100, but is preferably a separate member snap-fitted or otherwise fastened onto the valve member 100, as discussed further below, whereby different trim plates 144 having different shapes may be fastened to a generically configured valve member 100 to accommodate various exterior body panel contours.

The valve member 100 includes a valve guide member on the truncated portion 150 thereof, and the housing member 200 includes a housing guide member cooperatively engageable with the valve guide member to pivotally align the valve member 100 in the housing member 200. In the exemplary embodiment, the valve guide member is a shaft portion 152, and the housing guide member is an aperture 252 through the housing member 200, whereby the shaft portion 152 is pivotally disposed through the aperture 252 to align the valve member 100 along or relative to the pivot axis A. Alternatively, the housing guide member may be a bore extending into, but not through, the housing member 200 for accommodating the shaft portion 152, whereby the shaft portion 152 does not extend fully through the housing member 200, thereby preventing moisture and debris from entering into the valve receptacle 210. The shaft portion 152 may protrude from the housing member 200 and into a recess formed in the truncated portion 150 of the valve member 100. Alternatively, the valve and housing guide members may be an annular ridge cooperatively disposed in a complementarily shaped annular groove.

FIGS. 2a and 2b illustrate the housing member comprising a housing cover portion 202 and a housing shell portion 204, respectively. The housing shell portion 204 includes the valve receptacle 210 and an access opening 208 thereto, whereby the housing cover portion 202 is disposable over the access opening 208 and is securely coupleable to housing shell portion 204 to form the housing member 200 of FIG. 1. FIG. 2a illustrates the recess 252 formed through the housing cover portion 202. The housing cover portion 202 and the housing shell portion 204 are preferably configured for snap-fitting assembly. The housing cover portion 202 and housing shell portion 204 preferably include means to prevent rotation therebetween, for example snap-fitting structure, or adhesive, or ultrasonic welding, and combinations thereof.

Figure 2C:
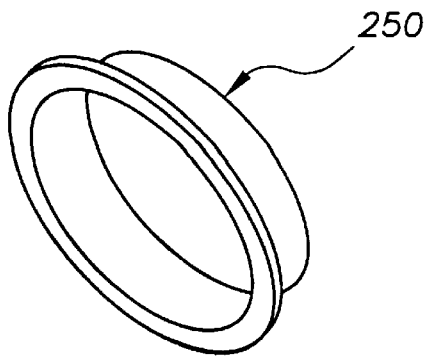
FIG. 2c is a perspective view of a fastening ring portion matable with the housing shell portion of FIG. 2b.

FIG. 2c is a fastening ring portion 250 of the housing member of FIG. 1, which may be formed integrally with the housing shell portion 204, but is preferably a separate member snap-fitted or otherwise fastened to the housing shell portion 204, as discussed further below, whereby fastening ring portions 250 having different shapes and mounting configurations are fastened to a generically configured housing member 200 to accommodate various automotive exterior body panel contours and openings.

FIGS. 3a and 3b illustrate the valve member 100 of FIG. 1 comprising a valve cover portion 102 and a valve shell portion 104, respectively. The valve shell portion 104 includes a passage receptacle 160 and an access opening 162 thereto. The inlet opening 120 and the outlet opening 130 of the valve member 100 are disposed in the valve shell portion 104. The valve cover portion 102 includes a cover plate 106 coupled to the passage 110 by a bracket 108. The passage 110 is disposable in the passage receptacle 160 of the valve shell portion 104 and in communication with the inlet opening 120 and the outlet opening 130. The cover plate 106 is disposable over the access opening 162 of the valve shell portion 104 and forms the truncated portion 150 of the valve member 100 of a FIG. 1. The valve cover portion 102 and valve shell portion 104 are preferably configured for snap-fitting assembly. The valve cover portion 102 and valve shell portion 104 also preferably include means to prevent rotation therebetween, for example snap-fitting structure, or adhesive, or ultrasonic welding, and combinations thereof.

FIGS. 1 and 3a illustrates the valve member 100 having a gear member 50 disposed thereon, and the housing member 200 having a rotatable drive gear 60 also shown in FIG. 2a engagable with the gear member 50 of the valve member 100 so as to pivot the valve member 100 in the valve receptacle 210 of the housing member 200. FIGS. 1 and 2a illustrate the drive gear 60 protruding through an opening 206 of the housing cover portion 202 and into the valve receptacle 210. In FIG. 1, the drive gear 60 is coupled to a rotatable drive member 70 mounted on the housing cover portion 202 in a drive housing 80, which is also mounted on the housing cover portion 202 of FIG. 2a. FIGS. 1 and 3a illustrate the gear member 50 disposed on the truncated portion 150 of the valve member 100. The gear member 50 may be a plastic material formed unitarily with the valve member 100 in a molding operation, and alternatively may be a separate member fabricated of metal or composite material fastened to the valve member 100.

The rotatable drive member 70 is preferably a reversible DC electric motor, which permits precise pivoting of the valve member 100 in both the clockwise and counter-clockwise directions so as to open and close the filler pipe 20. The gear member 50 and drive gear 60 are preferably spiroid gears, which permit location of the drive gear 60 relatively close to the rotation axis of the valve member 100. In one application, the gear ratio is preferably approximately 100:1.

The valve cover portion 102, the valve shell portion 104, the housing cover portion 202, and the housing shell portion 204 are preferably formed of fuel resistant plastic materials in molding operations. Thus formed, the valve member 100 and the housing member 200 have relatively constant wall thickness, and when assembled form a strong and durable, relatively lightweight assembly. The components of the valve and housing members 100 and 200 are designed to minimize the number of mold cavity parts required for manufacture, thereby reducing production costs.

The drive housing 80 of FIG. 2a may be molded unitarily with the housing cover portion 102, wherein access to the drive member 70 disposed therein is provided by a removable cover snap-fit onto a front side 82 or opposing rear side opening thereof. The drive housing 80 is alternatively molded separately, and subsequently fastened to the housing cover portion 202 by an adhesive, ultrasonic welding, or preferably by snap-fitting means to permit disassembly thereof and access to the rotatable drive member 70 disposed therein.

The trim plate 144 of FIG. 3c is preferably molded separately and includes stud members 145 disposable and retained in corresponding openings 146 formed in the valve shell portion 104 by an adhesive, ultrasonic welding, or preferably by snap-fitting means to permit quick and easy installation in assembly line operations. The openings 146 are formed preferably at an angle through a mounting surface 147 of the valve shell portion 104 toward the access opening 162 thereof, as illustrated, to reduce the number of mold parts required to produce the valve shell portion 104 and to facilitate separation thereof after molding. The stud members 145 on the trim plate 144 are formed at a similar angle, and preferably have different lengths to facilitate installation thereof in the corresponding openings 146 of the valve shell portion 104. The fastening ring portion 250 of FIG. 2c is also preferably molded separately from the housing shell portion 204 to simplify the molding operation, and is fastenable thereto during installation by an adhesive, ultrasonic welding, or by snap-fitting means.

In one embodiment, a first sealing member is disposed between the valve member 100 and the valve receptacle 210 about the inlet opening 220 of the housing member 200. In FIG. 1, the first sealing member is preferably first ring sealing member 90 disposed and retained in a first recess 212 in the valve receptacle 210 of the housing member 200 about the inlet opening 220 thereof. The first sealing member 90 provides a seal between the valve member 100 and the housing member 200 to close the filler pipe 20 when the inlet opening 120 of the valve member 100 is pivoted away from the inlet opening 220 of the housing member 200, whereby a portion of the partially substantially spherical portion 140 of the valve member 100, between the inlet and outlet openings 120 and 130 thereof, substantially opposite the trim plate mounting surface 147, covers and sealingly closes the filler pipe 20.

A second ring sealing member may disposed between the valve member 100 and the valve receptacle 210 about the outlet opening 230 of the housing member 200. The second sealing member is preferably a second ring sealing member disposed and retained in a second recess in the valve receptacle of the housing member 200 about the outlet opening 230 thereof. The second ring sealing member, not shown, is configured and mounted substantially the same as the first ring sealing member discussed above and illustrated in FIG. 1. The second sealing member provides a seal between the valve member 100 and the housing member 200 primarily to prevent debris from entering therebetween and from entering into the filler pipe 20.

The first and second sealing members may be formed alternatively as a resilient material, for example a thermoset silicone rubber material, disposed over at least a portion of the valve member 100. The first and second sealing members and various configurations thereof are discussed more fully in copending U.S. application Ser. No. 08/991,793 entitled "Automotive Fuel Filler Pipe Ball Valve Assembly".

FIG. 1 illustrates a flap valve member 300 disposed in either the fuel filler pipe 20 proximate the housing member 200 or in the inlet opening 220 thereof to close the filler pipe 20. The flap valve member 300 is preferably disposed in the filler pipe 20 for sealing the filler pipe 20 directly, thereby eliminating the necessity of the first sealing member disposed between the valve and housing members 100 and 200, as discussed above, and also eliminating the necessity of sealingly coupling the housing member 200 to the filler pipe 20 as discussed further below.

The flap valve 300 comprises generally a flapper portion 310 coupled to a hinge 320 and biased by a spring member, not shown, to close the filler pipe 20. The flapper portion 310 preferably includes a sealing member about its outer perimeter and engagable with an annular abutment member 330 to form a fluid tight seal therebetween. The annular abutment member 330 is part of the housing member 200, or alternatively some other structure sealingly coupled to the filler pipe 20 or housing member 200. The flapper portion 310 is pivotal in the direction of arrow G against the bias of the spring member so as to open the filler pipe 20 when a fuel pump nozzle, not shown, is disposed in the filler pipe 20. The flap valve member 300 may be used alone or in combination with the first sealing member discussed above. A flap valve suitable for this application is disclosed more fully in U.S. Pat. Nos. 4,986,439 and 5,195,566, issued Jan. 22, 1991 and Mar. 23, 1993, respectively, and both entitled "Cap for the Filler Neck of Liquid Containers".

FIG. 1 illustrates the inlet opening 220 of the housing member 200 extending through a neck portion 222 thereof coupled to the filler pipe 20. As discussed, the housing member 200 is preferably a molded plastic material, and in applications where the valve member 100 seals the filler pipe 20, the fuel filler pipe 20 is preferably insert molded in the inlet opening 220 of the neck portion 222. A ring type sealing member 22, illustrated partially in FIG. 1, is also preferably disposed about the pipe 20 prior to insert molding the filler pipe 20 in the housing member 200, whereby the sealing member 22 is ultimately disposed between the fuel filler pipe 20 and the inlet opening 220 to provide a leak-proof seal therebetween. A surface portion of the filler pipe 20 may be treated chemically prior to insert molding the pipe 20 in the housing member 200 to promote bonding therebetween. The housing member 200 neck portion 222 may be sealingly coupled to the filler pipe 20 by alternative fastening means.

In embodiments including the flap valve 300 disposed in the filler pipe 20, as discussed above, it may not be necessary to provide a fluid seal between the housing member 200 and the filler pipe 20. In the non-sealing embodiment, the neck portion 222 of the housing member 200 may be non-sealingly coupled to a threaded outer portion 21 of the filler pipe 20, for example by threads 221 formed on the interior of the neck portion 222, illustrated partially thereabout in FIG. 1, for quick and easy assembly.

FIGS. 1 and 3a illustrate a lip member 116 disposed in the passage 110 of the valve member 100. The lip member 116 is engagable with a fuel pump nozzle, for example a spring-like coil disposed thereabout, to securely retain the fuel pump nozzle in the filler pipe 20 during refueling operations. In FIG. 3a, the retaining lip 116 is formed unitarily with the passage 110, but in an alternative embodiment, the retaining lip 116 may be formed unitarily with the valve shell portion 104 and protrude through an opening in the passage 110, whereby the retaining lip 116 helps locate the passage 110 in the valve recess 160, and the passage 110 provides additional support for the retaining lip 116 after installation.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. An automotive fuel filler pipe valve assembly, comprising:
   a housing member comprising a housing shell portion defining a valve receptacle, an access opening defined within said housing shell portion for opening into said valve receptacle, and a housing cover disposed over said access opening, said valve receptacle having an inlet opening for fluidically communicating with an automotive fuel filler pipe, and an outlet opening; and
   a valve member having a substantially spherical portion and a truncated portion, having an internal passage with an inlet opening and an outlet opening, and having said substantially spherical portion of said valve member disposed within said valve receptacle of said housing member such that said valve member is pivotally movable about a pivot axis within said valve receptacle of said housing member between opened and closed positions with respect to said housing member such that when said valve member is disposed at said opened position, said inlet and outlet openings of said valve member are disposed in fluidic communication with said inlet and outlet openings of said housing member whereby fuel can be introduced into the fuel filler pipe, and when said valve member is disposed at said closed position, fluidic communication between said inlet and outlet openings of said valve member and said inlet and outlet openings of said housing member is blocked whereby fuel cannot be introduced into the fuel filler pipe.

2. The assembly of claim 1, the valve member having a valve guide member, and the housing member having a housing guide member, the valve guide member cooperatively engaged with the housing guide member to align the valve member relative to the pivot axis.

3. The assembly of claim 1, the valve member includes a shaft portion protruding from the truncated portion, the housing-cover portion having a recess, the shaft portion of the valve member pivotally disposed at least partially in the recess of the housing cover portion to align the valve member relative to the pivot axis.

4. The assembly of claim 1 further comprising a fastening ring portion disposed about the outlet opening of said housing member and coupled to the housing shell portion.

5. The assembly of claim 1 further comprising a portion of the partially substantially spherical portion of the valve member sealingly covering the fuel filler pipe when the valve member is pivoted to close fuel filler pipe, the inlet opening of the housing member sealingly coupled to the fuel filler pipe.

6. The assembly of claim 1 further comprising a flap valve member disposed in one of the fuel filler pipe and the inlet opening of the housing member to close the fuel filler pipe.

7. The assembly of claim 1 further comprising a first sealing member disposed between the valve member and the valve receptacle about the inlet opening of the housing member.

8. The assembly of claim 7, the first sealing member is a first ring member disposed and retained in a first recess in the valve receptacle of the housing member, the first recess disposed about the inlet opening of the housing member.

9. The assembly of claim 7, the first sealing member is a resilient material disposed over at least a portion of the valve member.

10. The assembly of claim 1 further comprising a second sealing member disposed between the valve member and the valve receptacle about the outlet opening of the housing member.

11. The assembly of claim 10, the second sealing member is a second ring member disposed and retained in a second recess in the valve receptacle of the housing member, the second recess disposed about the outlet opening of the housing member.

12. The assembly of claim 1, the valve member having an exterior side portion disposable in the outlet opening of the housing member when the fuel filler pipe is closed.

13. The valve assembly as set forth in claim 1, further comprising:
   a gear member disposed upon said valve member; and
   drive gear means disposed upon said housing and engageable with said gear member of said valve member for driving said gear member of said valve member so as to cause pivotal movement of said valve member about said axis and between said opened and closed positions when said drive gear means is driven.

14. An automotive fuel filler pipe valve assembly, comprising:

a housing member comprising a valve receptacle having an inlet opening for fluidically communicating with an automotive fuel filler pipe, and an outlet opening; and a valve member comprising a substantially spherical valve shell portion defining a passage receptacle, and a substantially truncated portion; an access opening defined within said shell portion for opening into said passage receptacle; an inlet opening and an outlet opening defined within said valve shell portion; a passage member, defining an internal passage fluidically connecting said inlet and outlet openings of said valve shell portion, disposed within said passage receptacle; and a valve cover connected to said passage member and disposed over said access opening of said valve shell portion; said substantially spherical portion of said valve member being disposed within said valve receptacle of said housing member such that said valve member is pivotally movable about a pivot axis within said valve receptacle of said housing member between opened and closed positions with respect to said housing member such that when said valve member is disposed at said opened position, said inlet and outlet openings of said valve member are disposed in fluidic communication with said inlet and outlet openings of said housing member whereby fuel can be introduced into the fuel filler pipe, and when said valve member is disposed at said closed position, fluidic communication between said inlet and outlet openings of said valve member and said inlet and outlet openings of said housing member is blocked whereby fuel cannot be introduced into the fuel filler pipe.

15. The assembly of claim 14 further comprising a shaft portion protruding from the valve cover portion, the housing member having a recess, the shaft portion pivotally disposed at least partially in the recess of the housing member to align the valve member relative to the pivot axis.

16. The assembly of claim 14 further comprising a trim plate coupled to valve shell portion to form an exterior side portion of the valve member disposable in the outlet opening of the housing member when the fuel filler pipe is closed.

17. The valve assembly as set forth in claim 14, further comprising:

a gear member disposed upon said valve member; and drive gear means disposed upon said housing and engageable with said gear member of said valve member for driving said gear member of said valve member so as to cause pivotal movement of said valve member about said axis and between said opened and closed positions when said drive gear means is driven.

18. An automotive fuel filler pipe valve assembly, comprising:

a housing member comprising a valve receptacle having an inlet opening for fluidically communicating with an automotive fuel filler pipe, an outlet opening; and a rotatable drive gear mounted upon said housing member; and a valve member having a substantially spherical portion and a substantially truncated portion, having an internal passage with an inlet opening and an outlet opening, and having said substantially spherical portion of said valve member disposed within said valve receptacle of said housing member such that said valve member is pivotally movable about a pivot axis within said valve receptacle of said housing member between opened and closed positions with respect to said housing member such that when said valve member is disposed at said opened position, said inlet and outlet openings of said valve member are disposed in fluidic communication with said inlet and outlet openings of said housing member whereby fuel can be introduced into the fuel filler pipe, and when said valve member is disposed at said closed position, fluidic communication between said inlet and outlet openings of said valve member and said inlet and outlet openings of said housing member is blocked whereby fuel cannot be introduced into the fuel filler pipe; and a gear member engageable with said rotatable drive gear of said housing member such that said rotatable drive gear can cause pivotal movement of said valve member about said axis and between said opened and closed positions when said rotatable drive gear is rotatably driven.

19. The assembly of claim 18 further comprising the gear member disposed on the truncated portion of the valve member, the gear member and rotatable drive gear are spiroid gears.

20. The assembly of claim 18 further comprising a rotatable drive member mounted on the housing member and coupled to the rotatable drive gear.

* * * * *